«3,265,565
PREPARATION AND FUNGICIDAL USE OF
TETRACYANODITHIADIENE
Everett J. Frazza, Yorktown Heights, N.Y., and Wesley O.
Fugate, Old Greenwich, Conn., assignors to American
Cyanamid Company, New York, N.Y., a corporation of
Maine
No Drawing. Filed Aug. 14, 1959, Ser. No. 833,698
4 Claims. (Cl. 167—33)

The present invention relates to novel tetracyanodithiadiene and methods of preparing same.

According to the instant discovery tetracyanodithiadiene having the structural formula

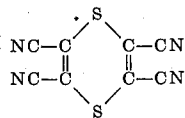

is prepared by bringing together in intimate contact an alkali metal salt of 1,2-dimercaptomaleonitrile having the formula

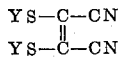

wherein Y is an alkali metal, and a halide having a strong electron-attracting moiety which is attached directly to the halogen atom, such as CNCl, Cl$_3$CSCl, MeSO$_2$Cl, and the like, and recovering the resulting tetracyanodithiadiene.

Pursuant to a particular embodiment of the present invention, cyanogen chloride is added to a cooled solution of the disodium salt of 1,2-dimercaptomaleonitrile (hereinafter also referred to as DSDMM) in water. A precipitate is formed which is filtered and dried and, upon recrystallization from dioxane, for example, yields a pale yellow powder identified as tetracyanodithiadiene.

While the reaction may be carried out with very desirable results in the presence of water, other inert media, such as benzene, tetrahydrofuran, and the like, which do not react under the conditions of the reaction may be employed.

Other typical halides contemplated herein having strong electron-attracting moieties, as opposed to electron-donating moieties, are NO$_2$Cl, NOCl, acyl halides, cyanogen halides, alkyl sulfonyl halides, such as methane sulfonyl chloride, and the like. The electron-attracting groups or moieties are characterized by the fact that when in the para-position of benzoic acid they render the acid more acidic than benzoic acid per se. Typical of these moieties are CN, NO$_2$, SO$_2$, and the like. The halides within the purview of the instant discovery are the halides of chlorine, bromine, iodine, and fluorine.

The reactants are generally brought together in equimolar amounts; however, an excess of either reactant may be employed.

As will be seen hereinafter, temperatures in the range of −20° C. to 150° C., preferably 15° C.–40° C., are employed. Likewise, the process contemplated herein may be carried out continuously, semi-continuously, batchwise, and at atmospheric, sub-atmospheric or super-atmospheric pressures.

In addition to the disodium salt of 1,2-dimercaptomaleonitrile, other alkali metal salts within the purview of the instant discovery are the corresponding potassium, lithium and like salts.

The instant discovery will best be understood by reference to the following illustrative examples:

Example I

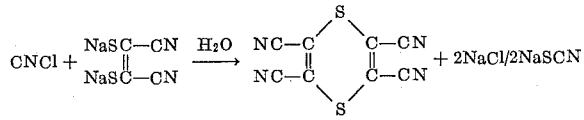

Freshly distilled cyanogen chloride (26.9 grams) is added to a stirred aqueous solution of the disodium salt of 1,2-dimercaptomaleonitrile (DSDMM) (37.2 grams of salt in 200 milliliters of H$_2$O) in ten minutes, the temperature of the aqueous solution being initially at 6° C. A temperature rise to 20° C. is observed during the addition and an ice bath used to maintain the temperature at 5° C.–10° C. until the exotherm subsides. After stirring for an additional two hours, the ice bath is removed. The resulting reaction mixture contains a heavy oily layer. Excess cyanogen chloride is removed therefrom by evaporation; filtration of the resulting aqueous suspension and drying of the solids removed leaves 11.2 grams (52 percent by weight of the product theoretically producible) of a crude yellow brown product.

Two purifications by solution in acetone (with Darco), filtration and reprecipitation with water followed by a similar procedure using ethyl acetate and heptane gives light yellow product tetracyanodithiadiene crystals which weigh 9.13 grams and melt at 212° C.–214° C. with decomposition. The infrared spectrum contains a CN band at 2250 cm.$^{-1}$ and a lowered C=C band at 1535 cm.$^{-1}$.

Calculated for C$_8$N$_4$S$_2$: C, 44.43; N, 25.91; S, 29.65. Found: C, 44.64; N, 26.12; S, 30.31. Molecular weight: theory, 216.2; found, 216.6.

Example II

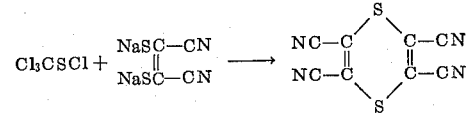

Perchloromethyl mercaptan (18.6 grams) is added to a stirred suspension of DSDMM (9.3 grams) in 100 milliliters of tetrahydrofuran and an exothermic reaction takes place; the resulting mixture is held at 25° C.–30° C. with a cooling bath and then allowed to stand overnight. Next, the mixture is heated under reflux for four hours, solids are filtered off, and the resulting filtrate taken up in ether and washed several times with water and saturated sodium chloride solution. Evaporation of the ether leaves 2.59 grams of brown solid which is dissolved in ethyl acetate and partially precipitated by the addition of cyclohexane. The resulting precipitate is product tetracyanodithiadiene.

Example III (A)

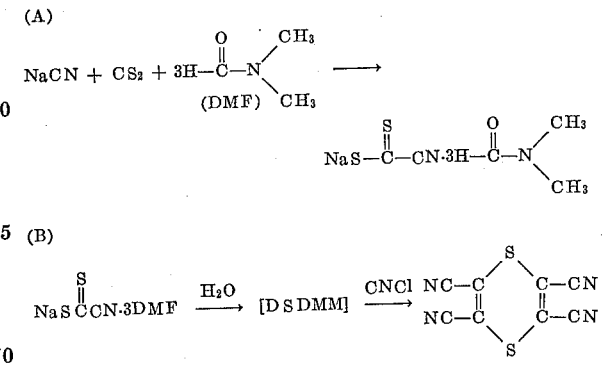

(B)

In reaction (A) carbon disulfide (152.0 grams) is added to a stirred suspension of sodium cyanide (98.0 grams) in dimethyl formamide over a 20–25 minute period. The temperature is held at 35° C.–40° C. with external cooling during the addition period and thereafter until the exotherm subsides. Near the end of the reaction the mixture thickens and stirring becomes more difficult. Twelve hundred and fifty milliliters of dry isobutanol is added, the resulting mixture heated to 60° C., filtered to remove unreacted sodium cyanide and cooled to −5° C. After suction filtration and washing with ether there is obtained about 560 grams of the dimethyl formamide complex of sodium cyanodithioformate as shiny yellow-brown prisms.

Freshly prepared dimethyl formamide complex of sodium cyanodithioformate (68.9 grams) so obtained is dissolved in 600 milliliters of water at about 20° C. and after standing for two hours the resulting solution is filtered to remove by-product sulfur. Cyanogen chloride (11.5 milliliters) is then added to the stirred filtrate in two minutes during which time a temperature rise from 20° C. to 22° C. is observed. After standing for an additional two hours, the resulting crude yellow-brown product is filtered off and dried in a vacuum desiccator. Three purifications by reprecipitation from acetone with water yields pure tetracyanodithiadiene.

As shown in Example III, above, the novel product of the present invention may be prepared in situ from the reaction product of the sodium salt of cyanodithioformic acid in water, which sodium salt in turn is prepared by the reaction of carbon disulfide, sodium cyanide, and 3 moles of dimethyl formamide.

Rather than use water in step (B) of Example III, supra, chloroform may be employed, for example, and the reaction product treated with CNCl as indicated.

*Example IV*

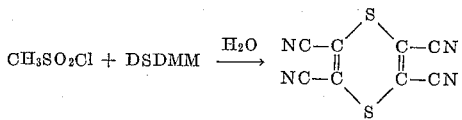

DSDMM (0.94 gram) is dissolved in 10 milliliters of H₂O and the resulting aqueous solution added to 1.03 grams of methanesulfonyl chloride and stirred. A mild exotherm to 32° C. occurs and a bright, red-orange color is formed. Agitation is maintained for about 10 minutes while externally cooling the reacting mass to about 22° C. A slurry is formed, decanted and the solids washed several times with water. Next, the solids are dissolved in acetone, reprecipitated with water and the precipitate dried. The dried product is tetracyanodithiadiene.

The tetracyanodithiadiene product of the present invention is an active fungicide. It may be used as a spray in an organic solvent, an emulsion in water or other nonsolvents, or on solid carriers, such as talcs, diatomaceous earths, and the like.

The activity of product tetracyanodithiadiene is illustrated as follows (all percentages given as percent by weight):

TABLE I.—FUNGI

| Tetracyanodithiadiene (Percent Concentration) | Sclerotinia fructigena, Percent Kill* | Stemphylium sarcinaeforme, Percent Kill* |
|---|---|---|
| .01 | 100 | 100 |

*Numerical percentage.

Referring to Table I, a water suspension of .01 percent tetracyanodithiadiene is prepared and the spores admixed therewith for a 20-hour period. After this period the spores are examined microscopically to determine percent germination.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. The method of fungicidal control comprising applying a fungicidally effective amount of tetracyano-1,4-dithiin.
2. A method for preparing tetracyanodithiadiene of the structural formula

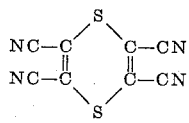

which comprises bringing together in intimate contact at a temperature in the range of −20° C. to 150° C. an alkali metal salt of 1,2-dimercaptomaleonitrile of the formula

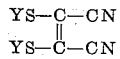

where Y is an alkali metal and a halide selected from the group consisting of cyanogen halides, carboxylic acid halides and nitrosyl halides and recovering the resulting tetracyanodithiadiene product.
3. The process according to claim 2 wherein the halide is cyanogen chloride.
4. The process according to claim 2 wherein the halide is a nitrosyl chloride.

References Cited by the Examiner

UNITED STATES PATENTS 2,991,292  7/1961  Degener et al. _____ 260—327
3,008,967  11/1961  Blomstrom et al. ____ 260—327

OTHER REFERENCES

Bahr, Agewandte Chemie, vol. 70, page 606 (1958).

WALTER A. MODANCE, *Primary Examiner.*

IRVING MARCUS, H. J. LIDOFF, MORRIS O. WOLK,
*Examiners.*

J. MILLER, DONALD B. MOYER, JAMES A. PATTEN, *Assistant Examiners.*